United States Patent [19]
Wakayama

[11] Patent Number: 5,566,284
[45] Date of Patent: Oct. 15, 1996

[54] APPARATUS AND METHOD FOR MIP-MAP GENERATION USING LOW-PASS FILTERING BASED ON RESOLUTION RATIO

[75] Inventor: Yorihiko Wakayama, Katano, Japan

[73] Assignee: Matsushita Electric Industrial Co., Ltd., Kadoma, Japan

[21] Appl. No.: 361,209

[22] Filed: Dec. 21, 1994

[30] Foreign Application Priority Data

Dec. 22, 1993 [JP] Japan .................... 5-325084

[51] Int. Cl.⁶ .................................................. G06T 15/50
[52] U.S. Cl. .................................................. 395/130
[58] Field of Search ................................. 395/130, 162

[56] References Cited

U.S. PATENT DOCUMENTS

| | | | |
|---|---|---|---|
| 3,993,976 | 11/1976 | Ginsberg | 340/146.3 P |
| 4,970,682 | 11/1990 | Beckwith et al. | 364/900 |
| 4,974,176 | 11/1990 | Buchner et al. | 364/522 |
| 5,001,561 | 3/1991 | Haskell et al. | 358/133 |
| 5,029,225 | 7/1991 | Ueda | 382/28 |
| 5,095,420 | 3/1992 | Eilert et al. | 395/400 |
| 5,097,427 | 3/1992 | Lathrop et al. | 395/130 |
| 5,109,451 | 4/1992 | Aono et al. | 382/56 |
| 5,222,205 | 6/1993 | Larson et al. | 395/130 |
| 5,224,208 | 6/1993 | Miller, Jr. et al. | 395/125 |
| 5,285,470 | 2/1994 | Schreiber | 375/1 |
| 5,287,209 | 2/1994 | Hiratsuka et al. | 395/109 |
| 5,300,949 | 4/1994 | Rodriguez et al. | 345/202 |
| 5,325,125 | 6/1994 | Naimpally et al. | 348/402 |
| 5,361,386 | 11/1994 | Watkins et al. | 395/130 |
| 5,388,167 | 2/1995 | Koga et al. | 382/50 |
| 5,436,733 | 7/1995 | Terada et al. | 358/448 |

FOREIGN PATENT DOCUMENTS

| | | |
|---|---|---|
| 4275685 | 10/1992 | Japan . |
| 546775 | 2/1993 | Japan . |
| 5210729 | 8/1993 | Japan . |
| 6162165 | 6/1994 | Japan . |

OTHER PUBLICATIONS

Foley et al., *Computer Graphics*, 1990, "Other Pattern Mopping Techniques," pp. 826–828.
Williams, Lance, "Pyramidal Parametrics", *Computer Graphics, vol. 17, No. 3, pp. 1–11, Jul. 1983.*
Wolber, George, "Separable Image Warping with Spatial Lookup Tables", *ACM Computer Graphics*, vol. 23, No. 3, pp. 369–378, Jul. 1989.
Heckbert, Paul S., "Survey of Texture Mapping", *Graphics Interface '68, Vision interface '86*, pp. 207–212, 1986.
Heckbert, Paul S., "Survey of Texture Mapping", *Ieee Computer Graphics and Applications*, pp. 56–67, 1986.
Foley, James D., et al, "Computer Graphics: Principles and Practices", *Addison–Wesley Publishing Co.*, 2nd ed. pp. 617–647 and 815–835, 1990.

*Primary Examiner*—Heather R. Herndon
*Assistant Examiner*—Rudolph Buchel
*Attorney, Agent, or Firm*—Renner, Otto, Boisselle & Sklar

[57] ABSTRACT

According to the MIP-map image generating apparatus of the invention, an original texture image stored in a memory is processed by spatial transformation in a discrete cosine transform section, so as to be spatial frequency image data. A polygon calculating section calculates the size of a polygon, and calculates resolution ratios of the texture to be mapped. A spatial low-pass filter allows the components of lower frequencies of the spatial frequency image data to pass therethrough using a cutoff frequency corresponding to the resolution ratios of the texture. After the filtered spatial frequency image data is processed by inverse spatial transformation, the size thereof is reduced. Thus, a MIP-map image having a predetermined size is obtained.

7 Claims, 8 Drawing Sheets

FIG. 6 x axis →

| 159 | 153 | 158 | 152 | 140 | 138 | 132 | 132 |
|---|---|---|---|---|---|---|---|
| 164 | 162 | 162 | 157 | 151 | 142 | 134 | 132 |
| 167 | 168 | 161 | 160 | 158 | 145 | 139 | 134 |
| 164 | 168 | 161 | 166 | 162 | 152 | 149 | 141 |
| 171 | 166 | 168 | 167 | 163 | 162 | 157 | 151 |
| 173 | 164 | 169 | 170 | 166 | 166 | 162 | 161 |
| 175 | 169 | 172 | 176 | 174 | 172 | 174 | 166 |
| 173 | 172 | 175 | 173 | 180 | 181 | 177 | 172 | y axis ↓

FIG. 7

DC component    fx →

| 260 | 49 | −16 | 5 | 2 | 4 | 0 | 1 |
|---|---|---|---|---|---|---|---|
| −79 | 36 | −2 | −7 | 1 | −3 | −1 | −2 |
| 0 | −8 | 3 | −2 | −2 | 1 | 5 | 1 |
| −8 | −4 | 5 | −4 | 1 | 7 | 6 | −2 |
| −2 | −6 | −1 | 0 | −4 | −1 | 0 | −1 |
| −3 | −2 | −1 | −1 | 1 | 2 | −5 | −1 |
| −4 | −1 | 1 | 0 | 0 | −2 | 2 | 0 |
| 1 | 1 | 1 | 1 | −1 | 1 | 0 | 0 | fy ↓

FIG. 8
| DC component | fx → | | | | | | |
|---|---|---|---|---|---|---|---|
| 260 | 49 | -16 | 0 | 0 | 0 | 0 | 0 |
| -79 | 36 | 0 | 0 | 0 | 0 | 0 | 0 |
| 0 | -8 | 0 | 0 | 0 | 0 | 0 | 0 |
| -8 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
(fy ↓, 53)
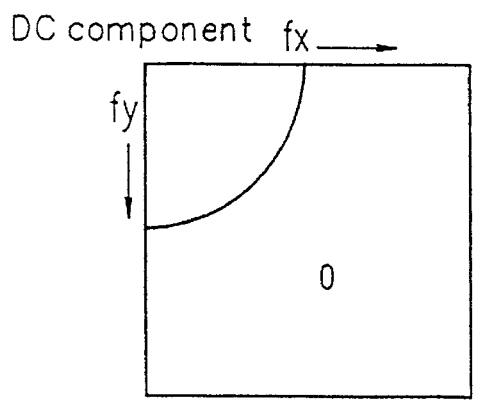
FIG. 9A
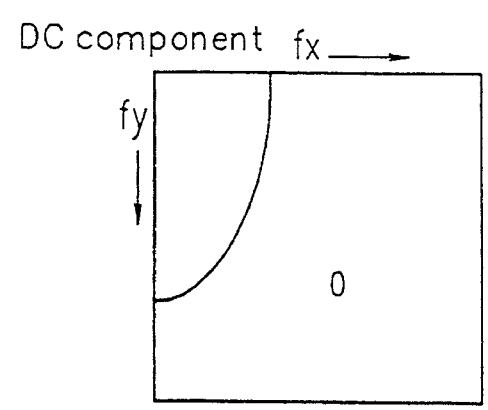
FIG. 9B
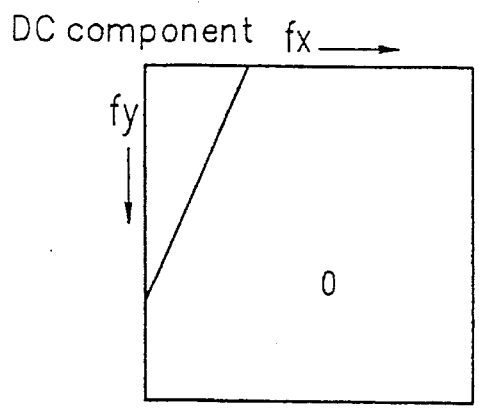
FIG. 9C

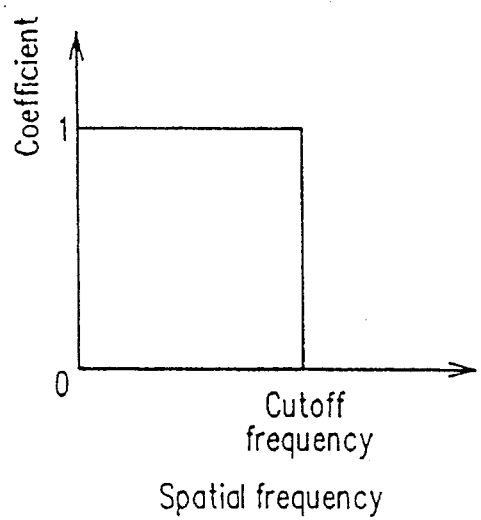
FIG. IOA
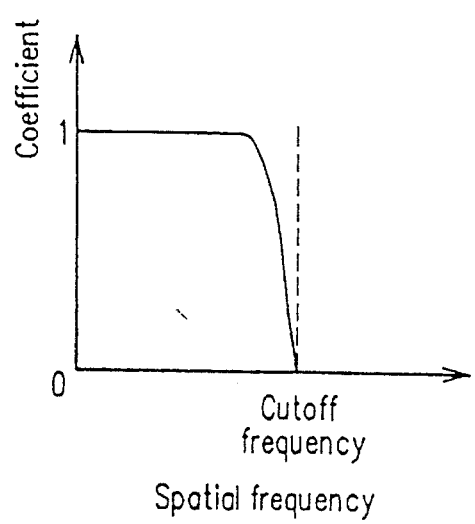
FIG. IOB
FIG. 11
| x axis → | | | | | | | |
|---|---|---|---|---|---|---|---|
| 153 | 153 | 152 | 149 | 144 | 137 | 131 | 126 |
| 158 | 158 | 157 | 154 | 149 | 142 | 135 | 131 |
| 165 | 164 | 163 | 160 | 155 | 148 | 141 | 137 |
| 167 | 167 | 167 | 164 | 159 | 153 | 147 | 143 |
| 167 | 168 | 168 | 167 | 163 | 158 | 153 | 149 |
| 166 | 168 | 169 | 170 | 168 | 165 | 161 | 159 |
| 168 | 170 | 173 | 175 | 175 | 174 | 171 | 170 |
| 169 | 172 | 176 | 179 | 181 | 180 | 179 | 177 |
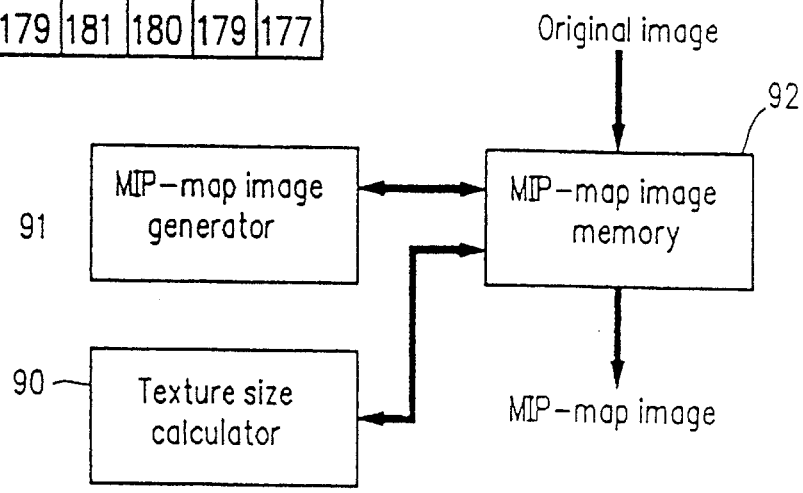
FIG. 12
PRIOR ART

APPARATUS AND METHOD FOR MIP-MAP GENERATION USING LOW-PASS FILTERING BASED ON RESOLUTION RATIO

BACKGROUND OF THE INVENTION

1. Field of the Invention

The present invention relates to an image generating apparatus and an image generating method. More particularly, the present invention relates to a MIP-map image generating apparatus and a MIP-map image generating method for a surface texture image of a displayed object in 3-dimensional (3D) computer graphics.

2. Description of the Related Art

Recently, in order to attain a higher reality, texture mapping methods in which textures (patterns) are provided on the surface of an object to be displayed on a display is being intensively studied in the field of computer graphics. Hereinafter, an exemplary apparatus for image generation using a conventional texture mapping method will be described with reference to the relevant figures.

With 3D computer graphics, it is necessary to convert the coordinates of a 3D image defined in a 3D coordinate system called "a world coordinate system" into coordinates in a 2-dimensional (2D) coordinate system called "a display coordinate system". The coordinates in the "display coordinate system" can be expressed as a pair of integer values. The integer values have maximum values which are equal to the numbers of pixels in the horizontal direction and the vertical direction, respectively, of the display that is to be employed. For example, in the case where the employed display has 640 pixels in the horizontal direction, and 480 pixels in the vertical direction, the x-coordinate of the display coordinates (x, y) is an integer in the range of 1 to 640, and the y-coordinate thereof is an integer in the range of 1 to 480.

In the 3D space, the minimum unit for representing a 3D image is a polyhedron called "a polygon". A distance from a view point to the polygon in the world coordinate system is simply referred to as "a distance to polygon". The distance to the polygon and the view angle determine the size of the polygon to be actually displayed on the display screen. The size of the polygon to be actually displayed on the display screen is simply referred to as "a polygon size". For example, if the distance to a polygon is small or if the view angle is small, the polygon size is relatively large. On the other hand, if the distance to a polygon is large or if the view angle is large, the polygon size is relatively small.

When a polygon is to be displayed, in order to make the graphics more realistic, it is necessary to use texture mapping for providing a texture to the surface of the polygon. In order to make the displayed image more natural, it is necessary to change the degree of pattern density of the texture depending on the polygon size. The degree of pattern density of the texture is referred to as "the size of texture". The size of texture is required to increase as the polygon size increases. For this purpose, a MIP (multum in parvo, Latin for many things in a small place) map texture mapping method is conventionally used. In the MIP-map texture mapping method, a texture pattern including a number of sizes of texture corresponding to polygon sizes is previously generated, and they are mapped to the polygon as required.

Referring to FIG. 12, the construction of a conventional apparatus for image generation using texture mapping will be described. A texture size calculator 90 calculates an appropriate size of texture corresponding to the polygon size. A MIP-map image generator 91 generates a number of various MIP-map images with different sizes of texture. A MIP-map image memory 92 stores the MIP-map images generated in the MIP-map image generator 91. The MIP-map image memory 92 receives the information related to the size of texture obtained by the texture size calculator 90, and outputs one of the stored MIP-map images corresponding to the received size of texture.

Referring to FIG. 13, a MIP-map image is described. An original texture image 95 is composed of 8×8 pixels, and a MIP-map image 96 is composed of 4×4 pixels. Herein, the "resolution" is indicated by the number of pixels in both horizontal and vertical directions constituting a texture image. Accordingly, if a texture image has a greater number of pixels, the texture image is said to have a higher resolution. The resolution of the MIP-map image 96 is ½ of that of the original texture image 95 in both directions. The ratio of the resolution of the MIP-map image to that of the original texture image is referred to as "a resolution ratio". The resolution ratio of the MIP-map image 96 to the original texture image 95 is ½ in each of both directions.

Referring back to FIG. 12, the operation of a conventional apparatus for image generation using texture mapping will be described. The original texture image 95 shown in FIG. 13 is temporarily stored in the MIP-map image memory 92. Then, the MIP-map image generator 91 receives the original texture image 95 from the MIP-map image memory 92. The MIP-map image generator 91 generates MIP-map images having various resolutions from the original texture image 95, and outputs the MIP-map image to the MIP-map image memory 92. The MIP-map image memory 92 stores the generated MIP-map image. For example, when a MIP-map image with 4×4 pixels is to be generated from an original texture image of 8×8 pixels as shown in FIG. 13, the original texture image is first divided into blocks each comprising 2×2 pixels, and one of the pixels in one divided block is output as one pixel of the MIP-map image.

The texture size calculator 90 calculates the resolution of the MIP-map image corresponding to the size of the polygon that is to be displayed. In addition, the texture size calculator 90 calculates the resolution ratio, i.e., the ratio of the resolution of the MIP-map image to that of the original texture image. The obtained information of the resolution ratio is applied to the MIP-map image memory 92. In the case shown in FIG. 13, the information that the resolution ratio is ½ is applied to the MIP-map image memory 92.

The MIP-map image memory 92 selects and outputs a MIP-map image, for example, corresponding to the resolution of ½ from the previously stored MIP-map images.

However, the above-described conventional method involves the following problems. In order to store various MIP-map images with a plurality of different resolutions which have been previously generated, the MIP-map image memory is required to have a large capacity. The greater the number of texture patterns, the MIP-map image memory is required to be very large.

Furthermore, in general, the normal of a face onto which the MIP-map is mapped does not coincide with a view direction. Therefore, in some cases, the length-to-width ratio of the MIP-map image does not coincide with the length-to-width ratio of the original texture image. This means that it is necessary to prepare a vertically long texture pattern or a wide texture pattern as a MIP-map image. For this reason, the memory capacity is required to increase.

SUMMARY OF THE INVENTION

The apparatus for MIP-map image generation of this invention, which receives an original image of texture and reduces the original image in size in accordance with a size of a polygon to which the texture is mapped, includes image dividing means for receiving the original image and for dividing the original image, to generate image blocks; spatial transformation means for transforming each of the image blocks in a spatial domain into a spatial frequency image block in a spatial frequency domain; image storing means for storing the spatial frequency image data block; MIP-map resolution calculating means for calculating a size of a polygon to be displayed on a display, and for calculating a resolution corresponding to the size of the polygon; low-pass filter means for removing, from the spatial frequency image data block, components having higher frequencies which are higher than a predetermined frequency corresponding to the resolution obtained by the MIP-map resolution calculating means, to generate a filtered spatial frequency image data block; and inverse spatial transformation means for receiving the filtered spatial frequency image data block, and for transforming the filtered spatial frequency image data block into a filtered image block in the spatial domain.

In one embodiment of the invention, the spatial transformation means transforms each of the image blocks into the spatial frequency image data block by discrete cosine transform, and the inverse spatial transformation means transforms the filtered spatial frequency image data block into the filtered image block by inverse discrete cosine transform.

In another embodiment of the invention, the image dividing means divides the original image of texture into image blocks, the numbers of the image blocks in a horizontal direction and in a vertical direction being the power of 2.

According to another aspect of the invention, an apparatus for MIP-map image generation includes image dividing means for receiving an image of texture to be mapped onto a polygon and for dividing the image, to generate image blocks; spatial transformation means for transforming each of the image blocks in a spatial domain into spatial frequency image block in a spatial frequency domain; data compression means for compressing the spatial frequency image data block without loss of information, to generate a compressed spatial frequency image data block; texture image storing means for storing the compressed spatial frequency image data block; data expansion means for expanding the compressed spatial frequency image data block which is stored in the texture image storing means, to generate a spatial frequency image data block; MIP-map resolution calculating means for calculating a size of the polygon to be displayed on a display, and for calculating a texture resolution corresponding to the size of the polygon; low-pass filter means for removing, from the spatial frequency image data block, components having higher frequencies which are higher than a predetermined frequency corresponding to the texture resolution obtained by the MIP-map resolution calculating means, to generate a filtered spatial frequency image data block; and inverse spatial transformation means for receiving the filtered spatial frequency image data block, and for transforming the filtered spatial frequency image data block into a filtered image block in the spatial domain.

According to another aspect of the invention, an apparatus for MIP-map image generation, which receives original image data representing a 2-dimensional image, and outputs transformed image data representing an image with a size different from that of the 2-dimensional image, includes spatial transformation means for receiving the original image data in a spatial domain, and for transforming the original image data into a spatial frequency image data in a spatial frequency domain, to output the spatial frequency image data; low-pass filter means for receiving the spatial frequency image data in the spatial frequency domain, and for removing components having frequencies higher than a predetermined frequency, to output filtered spatial frequency image data; and inverse spatial transformation means for receiving and transforming the filtered spatial frequency image data in the spatial frequency domain, and for outputting transformed image data in the spatial domain.

According to another aspect of the invention, a method for MIP-map image generation, for receiving original image data representing a 2-dimensional image, and for outputting transformed image data representing an image with a size different from that of the 2-dimensional image, includes a spatial transformation step of receiving the original image data in a spatial domain, and of transforming the original image data into a spatial frequency image data in a spatial frequency domain; a low-pass filtering step of receiving the spatial frequency image data in the spatial frequency domain, and of removing components having frequencies higher than a predetermined frequency, to output filtered spatial frequency image data; and an inverse spatial transformation step of receiving the filtered spatial frequency image data in the spatial frequency domain, and of transforming the filtered spatial frequency image data into transformed image data in the spatial domain.

In one embodiment of the invention, the method further includes between the spatial transformation step and the inverse spatial transformation step: data compressing step of compressing the spatial frequency image data; data storing step of storing the compressed spatial frequency image data; and data expanding step of expanding the stored and compressed spatial frequency image data, to obtain spatial frequency image data.

According to the apparatus for MIP-map image generation of the invention, an original texture image in a spatial domain stored in a memory is processed by spatial transformation, so as to be spatial frequency image data in a spatial frequency domain. In the spatial transformation such as a discrete cosine transformation, an image is processed by spatial transformation and then the processed image is processed by inverse spatial transformation, so as to reconstruct the original image.

The spatial frequency image data is input into a low-pass filter having a cutoff frequency corresponding to the size of polygon. In the case where the original texture image is mapped onto a smaller polygon, only lower frequencies are required for the original image, as compared with the case where the original texture image is mapped onto a larger polygon. If the original image has higher frequency components which are not required, aliasing noise may be caused in the MIP-map image.

Therefore, the spatial frequency image data is filtered in order to remove the higher frequency components which are not required in the spatial frequency domain. The filtered spatial frequency image data is processed by inverse spatial transformation, so as to be transformed into an image in the spatial domain. Then, the image is reduced in size. As a result, a MIP-map image having a predetermined size is obtained.

Thus, the invention described herein makes possible the advantage of providing a MIP-map image generating apparatus and a MIP-map image generating method, by which only the original texture images are stored, and a texture with a desired resolution can be generated in real time.

This and other advantages of the present invention will become apparent to those skilled in the art upon reading and understanding the following detailed description with reference to the accompanying figures.

BRIEF DESCRIPTION OF THE DRAWINGS

FIG. 6 is a diagram showing an image block.

FIG. 7 is a diagram showing a spatial frequency image data block.

FIG. 8 is a diagram showing a filtered spatial frequency image data block.

FIGS. 9A to 9C are diagram showing the range of region for replacing the image data block with "0".

FIGS. 10A and 10B are diagrams showing filter functions.

FIG. 11 is a diagram showing a filtered image block.

FIG. 12 is a diagram showing the construction of a conventional texture mapping image generating apparatus.

DESCRIPTION OF THE PREFERRED EMBODIMENTS

Figure 1:
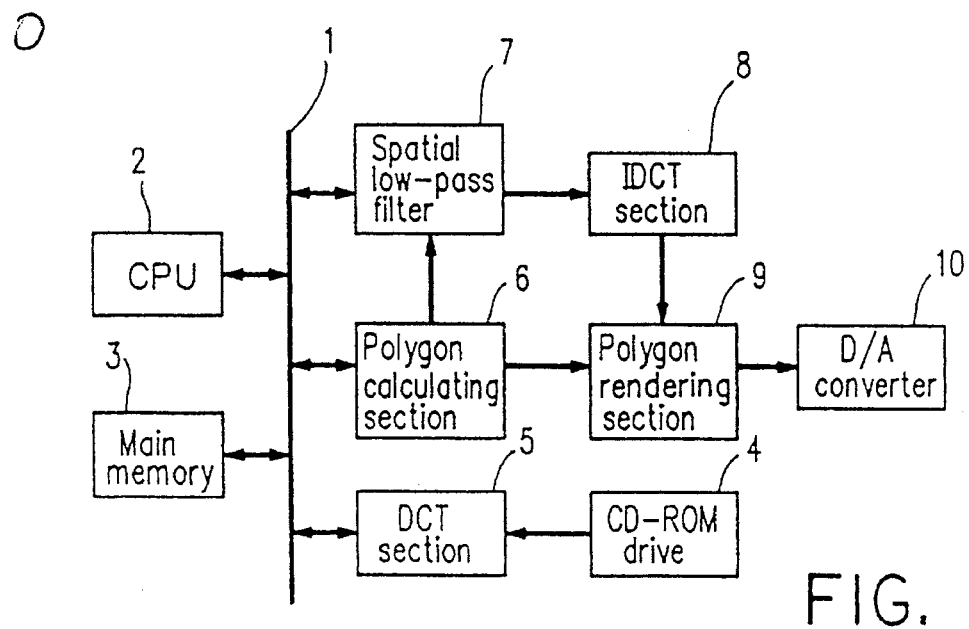
FIG. 1 is a diagram showing a MIP-map image generating apparatus according to the invention.

Hereinafter, a MIP-map image generating apparatus and a MIP-map image generating method according to the invention will be described with reference to the relevant figures. Throughout the figures, like reference numerals are used for designating like elements or steps.

Referring to FIG. 1, the MIP-map image generating apparatus of the invention includes a data bus 1, a central processing unit (CPU) 2, a main memory 3, a CD-ROM drive 4, a discrete cosine transforming section (hereinafter referred to as a DCT section) 5, a polygon calculating section 6, a spatial low-pass filter 7, an inverse discrete cosine transforming section (hereinafter referred to as an IDCT section) 8, a polygon rendering section 9, and a digital-to-analog converter (a D/A converter) 10. The operations of the respective sections will be described below.

The data bus 1 is provided for transferring data between the respective function blocks, i.e., the CPU 2, the main memory 3, the DCT section 5, the polygon calculating section 6, and the spatial low-pass filter 7. As for the data bus 1, a 32-bit bus can be used for enabling a high-speed processing. However, the data bus 1 is not limited to such a 32-bit bus.

The CPU 2 manages the operation of the whole system, and controls the respective function blocks. Also, the CPU 2 controls the data transmission between the data bus 1 and the main memory 3.

The main memory 3 stores image data output from the DCT section 5. The image data stored in the main memory 3 is output to the spatial low-pass filter 7 in accordance with a command from the CPU 2. The main memory 3 generally includes a plurality of large-capacity RAMs (random access memories). The main memory 3 is not limited to such a semiconductor device, but may be, for example, a large-capacity memory device such as a hard-disk drive and a magneto-optical disk drive.

The CD-ROM drive 4 is used for reading data from a CD-ROM (not shown) in which original texture image data sets are stored. As an original texture image, for example, a square image including 256×256 pixels in rows and columns can be used. In order to generate a color MIP-map image, it is necessary to prepare data sets of three colors, i.e., red, green, and blue as the original texture image data. The medium for storing the original texture image data sets is not limited to the CD-ROM, but can be a semiconductor memory, a hard disk, or a magneto-optical disk insofar as it has a large capacity. An appropriate data reading device can be employed depending on the medium that is to be used.

Figure 2:
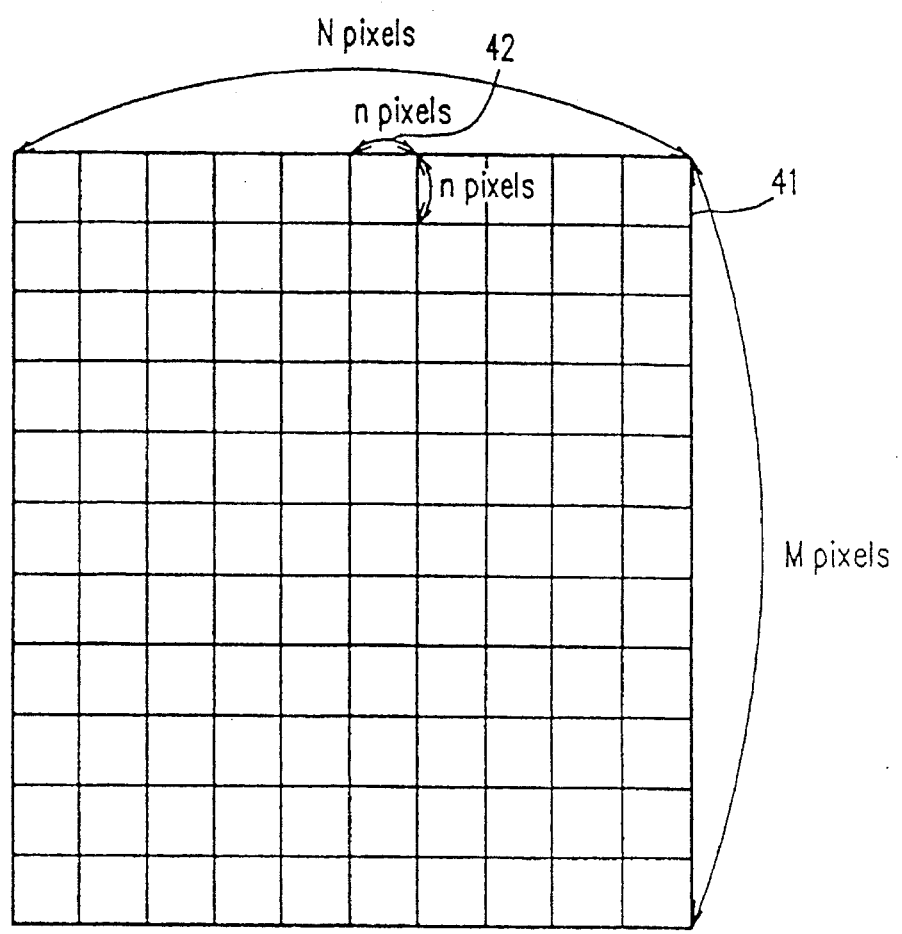
FIG. 2 is a diagram showing an original texture image and a plurality of divided image blocks.

The DCT section 5 receives, as its input, the original texture image data read out from the CD-ROM by the CD-ROM drive 4. First, the DCT section 5 divides the original texture image into a plurality of image blocks. FIG. 2 shows an image 41 including M pixels in the vertical direction and N pixels in the horizontal direction, and image blocks 42 which are obtained by dividing the image 41. Each of the image blocks 42 includes n pixels in the vertical direction and n pixels in the horizontal direction. In this example, the case of n=8 is described. However, the value of n can be selected desirably. For example, the value of n may be 16. After the image 41 is divided into the image blocks 42, the discrete cosine transformation is performed to the respective image blocks 42. As a result, each of the image blocks 42 is transformed into a spatial frequency image data block in a spatial frequency domain. Herein, the term "image block" indicates a unit of data which is obtained by dividing the original texture image into units of 8×8 pixels in both vertical and horizontal directions.

The size of the image block is preferably selected from the range of 8 to 16 pixels in both directions, in view of the transformation efficiency of the discrete cosine transformation and the inverse discrete cosine transformation. However, the size of the image block is not limited to this range. If the scale of the discrete cosine transforming apparatus and the inverse discrete cosine transforming apparatus is large, it is possible to handle image blocks each having a large size. In addition, if the number of pixels in both directions (the number of data pieces) is equal to the power of 2, a fast processing can be realized by using various fast transforming algorithms.

The DCT section 5 can be implemented by processing the image in a hardware manner. For example, the DCT section 5 may be included in a DSP (digital signal processor) dedicated for image processing as a part of the DSP's functional block. Alternatively, the DCT section 5 can be implemented by the wired logic in accordance with a custom-made ASIC (application specific integrated circuit). The function of the DCT section 5 can be implemented only in the software. In such a case, for example, a program for discrete cosine transformation stored in the main memory 3 can be used.

The polygon calculating section 6 converts the coordinates of a polygon in a world 3D coordinate system into coordinates in a display 2D coordinate system. The polygon calculating section 6 also calculates the above-described "resolution ratio" in order to reduce the size of the original texture to a size of texture corresponding to the size of the polygon on the display screen.

Figure 3A:
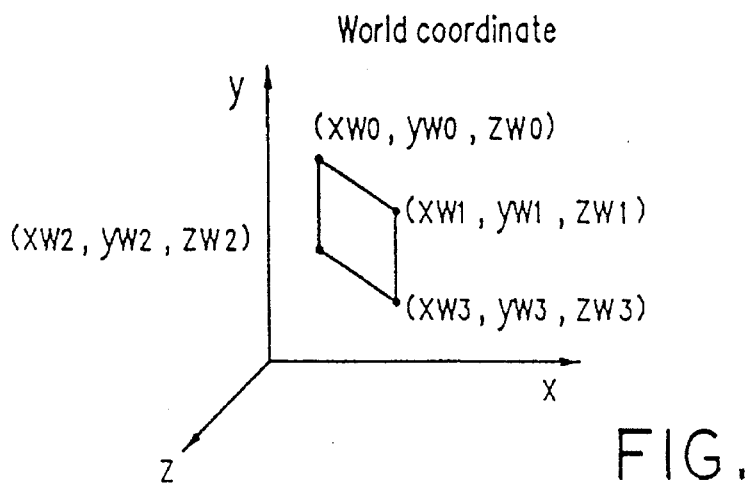
FIGS. 3A to 3C are diagrams for illustrating the operation in the polygon calculating section.
Figure 3B:
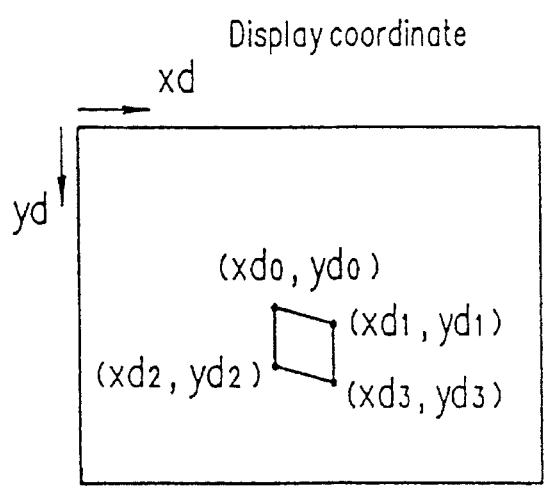
Figure 3C:
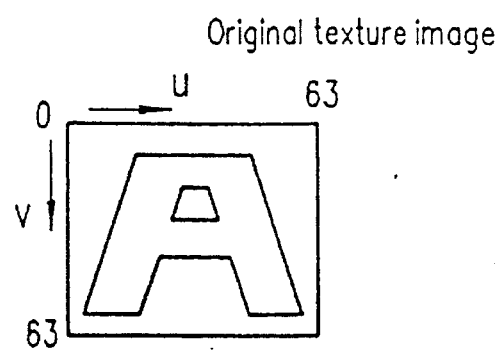

Referring to FIGS. 3A to 3C, the operation performed in the polygon calculating section 6 will be described. FIG. 3A shows a quadrangle constituting a polygon in the world coordinate system. FIG. 3B shows the quadrangle which is converted into the display coordinate system. For example, a quadrangle is defined by four points in the world coordinate system which have coordinates as follows:

$$(xw, yw, zw) = (xw0, yw0, zw0),$$
$$(xw1, yw1, zw1),$$
$$(xw2, yw2, zw2), \text{ and}$$
$$(xw3, yw3, zw3).$$

It is assumed that the coordinates in the world coordinate system will be converted into coordinates in the display coordinate system defined as follows:

$$(xd, yd) = (xd0, yd0),$$
$$(xd1, yd1),$$
$$(xd2, yd2), \text{ and}$$
$$(xd3, yd3).$$

FIG. 3C shows that an original texture image is composed of 64 pixels in the vertical direction and 64 pixels in the horizontal direction. The texture resolution ratio at this time is a ratio of each side in the display coordinate system to a corresponding side in the original texture image. It is assumed that the mapping is performed in such a manner that the four points in the original texture image:

$$(u, v) = (0,0)$$
$$(63, 0)$$
$$(0, 63)$$
$$(63, 63),$$

are mapped to the vertices of the quadrangle in the world coordinate system having the following coordinates:

$$(xw, yw, zw) = (xd0, yd0),$$
$$(xd1, yd1),$$
$$(xd2, yd2), \text{ and}$$
$$(xd3, yd3).$$

Then, the texture resolution ratios in the x-axis (horizontal) direction and the y-axis (vertical) direction are given by the following equations:

$$Tx=\{(xd0-xd1)^2+(yd0-yd1)^2\}^{0.5}/64$$

$$Ty=\{(xd0-xd2)^2+(yd0-yd2)^2\}^{0.5}/64$$

Based on the texture resolution ratios which are obtained as described above, the spatial low-pass filter 7 removes higher frequency components which are higher than a selected frequency among the frequency components included in the data block. For example, the case of the texture resolution ratios $Tx=Ty=0.5$ is compared with the case of the texture resolution ratios $Tx=Ty=0.1$. In the case of $Tx=Ty=0.1$, the size of polygon is small as compared with the case of $Tx=Ty=0.5$. Accordingly, the cutoff frequency should be made lower in the case of $Tx=Ty=0.1$. This is because the image quality is deteriorated by aliasing noise, when the size of polygon is small and the original texture has higher frequency components.

The IDCT section 8 receives the filtered spatial frequency image data block, performs the inverse discrete cosine transformation to this, so as to generate a filtered image block in a spatial domain. Similar to the DCT section 5, the IDCT section 8 can be implemented either by hardware or by software.

The polygon rendering section 9 receives and 15 merges the filtered image block which is generated by the IDCT section 8, so as to generate a filtered image. The filtered image has the same size as that of the image data which has been read out from the CD-ROM drive 4. Therefore, in order to generate a texture image which is to be mapped to the polygon, the filtered image is reduced in size, so as to generate a MIP-map image. A typical method for reducing the size of image is to "decimate (or omit)" the pixels. For example, in order to generate an image having a size of 75% with respect to the original image in both directions, it is sufficient to decimate one pixel out of every four pixels. As the ratio for reducing the size of the image, the texture resolution ratios in both directions obtained by the polygon calculating section 6 are used, as described above. The MIP-map image having the thus reduced size is mapped to the polygon. In the case where the texture mapped to the polygon is repeated, for example, in block units of 8×8 pixels in both directions, it is not necessary to merge the image blocks. In this case, it is sufficient to reduce each image block and to map the image block to the polygon.

The polygon rendering section 9 is required to operate at a high speed, so it is often implemented in dedicated hardware. Alternatively, by using a multi-processor system which is programmed so as to enable a pipe-line processing, it is possible to perform the polygon rendering processing by programming logic.

The D/A converter 10 receives the digital image data which is obtained by the polygon rendering section 9, and generates an analog signal for display. As the D/A converter 10, a dedicated integrated circuit for the image processing is typically used.

In this example, a discrete cosine transformation is used as the spatial frequency transformation, and an inverse discrete cosine transformation is used as the inverse spatial frequency transformation. However, other transforming methods can be used if they are a pair of a spatial frequency transformation and an inverse spatial frequency transformation. For example, a pair of discrete Fourier transformation and inverse discrete Fourier transformation, or a pair of Wavelet transformation and inverse Wavelet transformation can be used.

In this example, in the discrete cosine transforming section 5, the spatial frequency image data block which has been subjected to the discrete cosine transformation is stored in the main memory 3 without data compression. Alternatively, before the spatial frequency image data block is stored into the main memory 3, the spatial frequency image data block can be compressed without loss of information. If the compression involves loss of information of the image, the quality of the image aquired by expansion of the compressed image deteriorates. Accordingly, compression method or device which does not involve loss of information is preferable. The spatial frequency image data block is expanded before it is applied to the spatial low-pass filter 7. The compression and expansion can be performed in software, for example, by the CPU 2. In this case, the circuit configuration is the same as that shown in FIG. 1.

Figure 4:
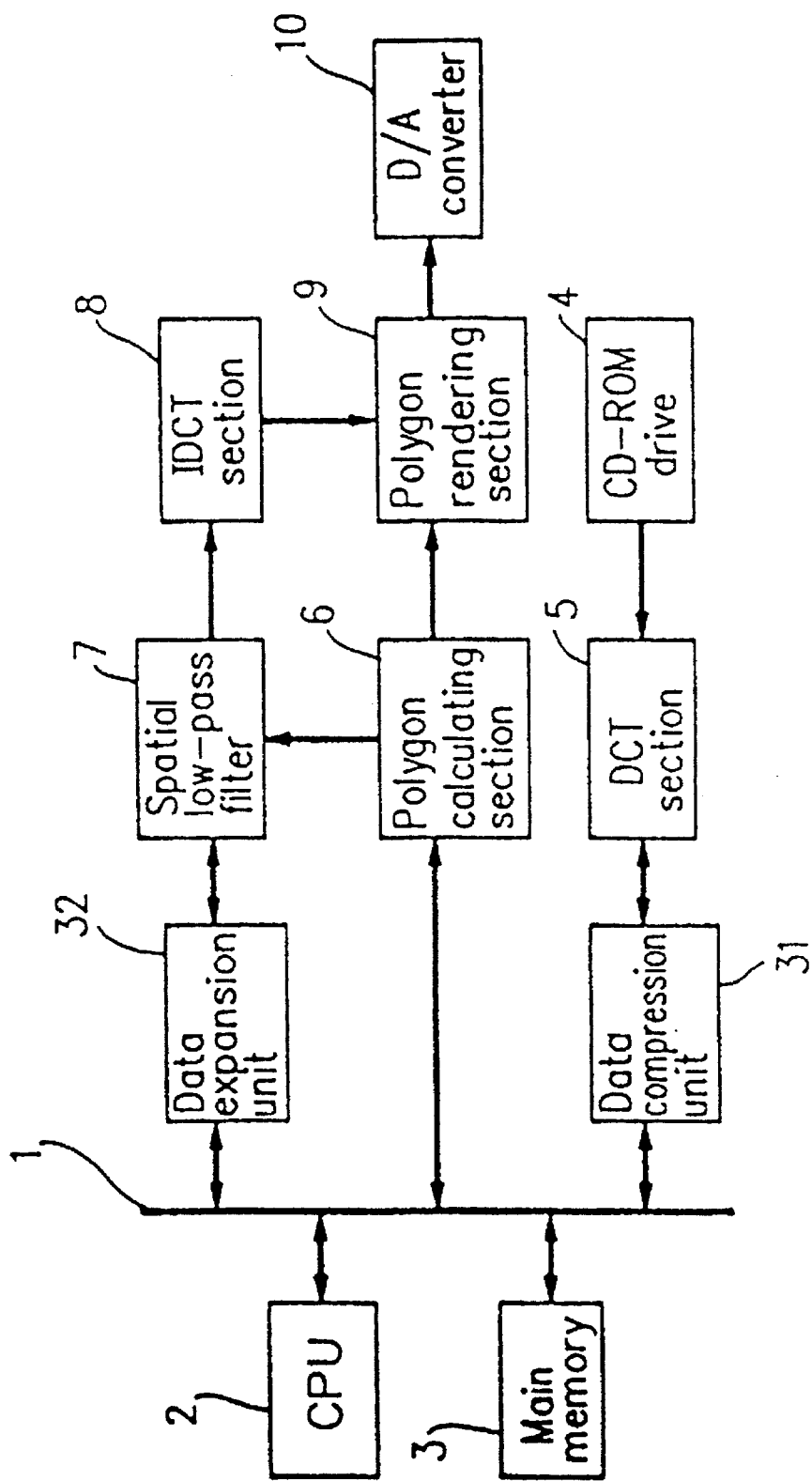
FIG. 4 is a diagram showing another example of a MIP-map image generating apparatus according to the invention.

The compression and expansion can be performed in hardware such as a dedicated DSP (digital signal processor). In this case, a data compression unit 31 is provided between the DCT section 5 and the data bus 1, and a data expansion unit 32 is provided between the data bus 1 and the spatial low-pass filter 7 as shown in FIG. 4. As a result, the data size of the spatial frequency image data block transferred through the data bus 1 can be reduced. Accordingly, the time occupied by the data bus 1 is reduced, and the hardware assets can be more effectively utilized. Furthermore, use of data compression and expansion enables a greater amount of texture data having various patterns and sizes to be stored in the main memory 3 and to reduce data access time resulting in a faster generation of MIP-map images.

Figure 5:
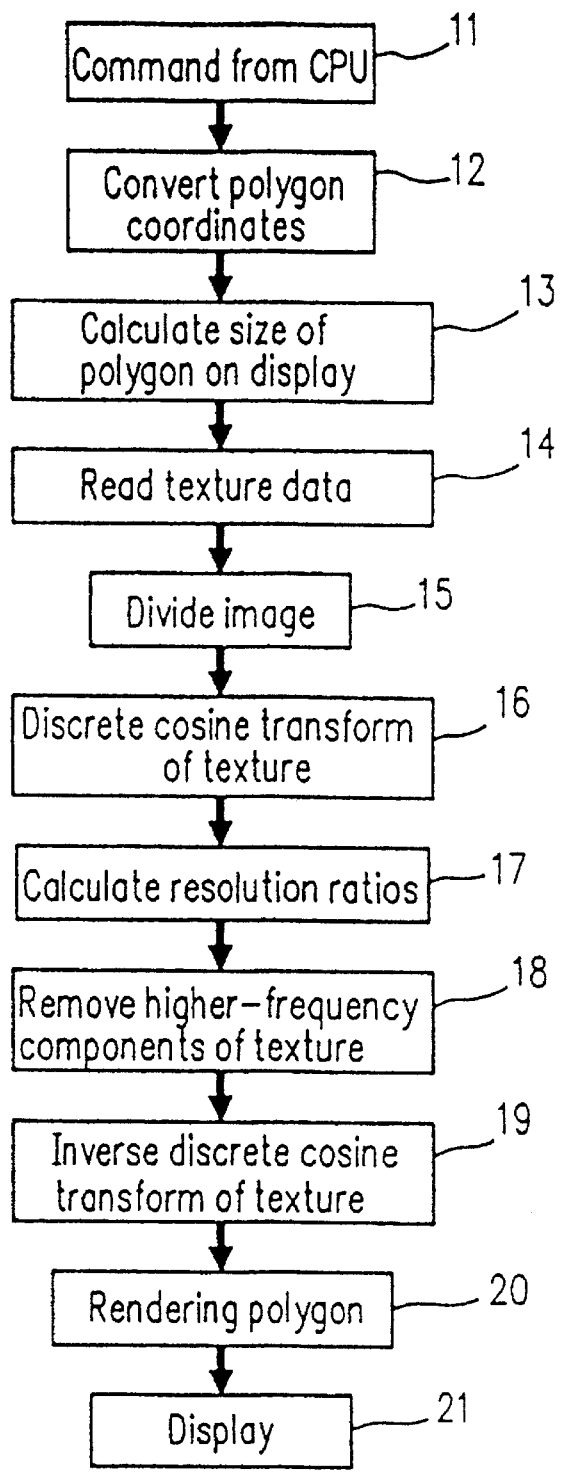
FIG. 5 is a flowchart showing a MIP-map image generating method according to the invention.
Figure 13:
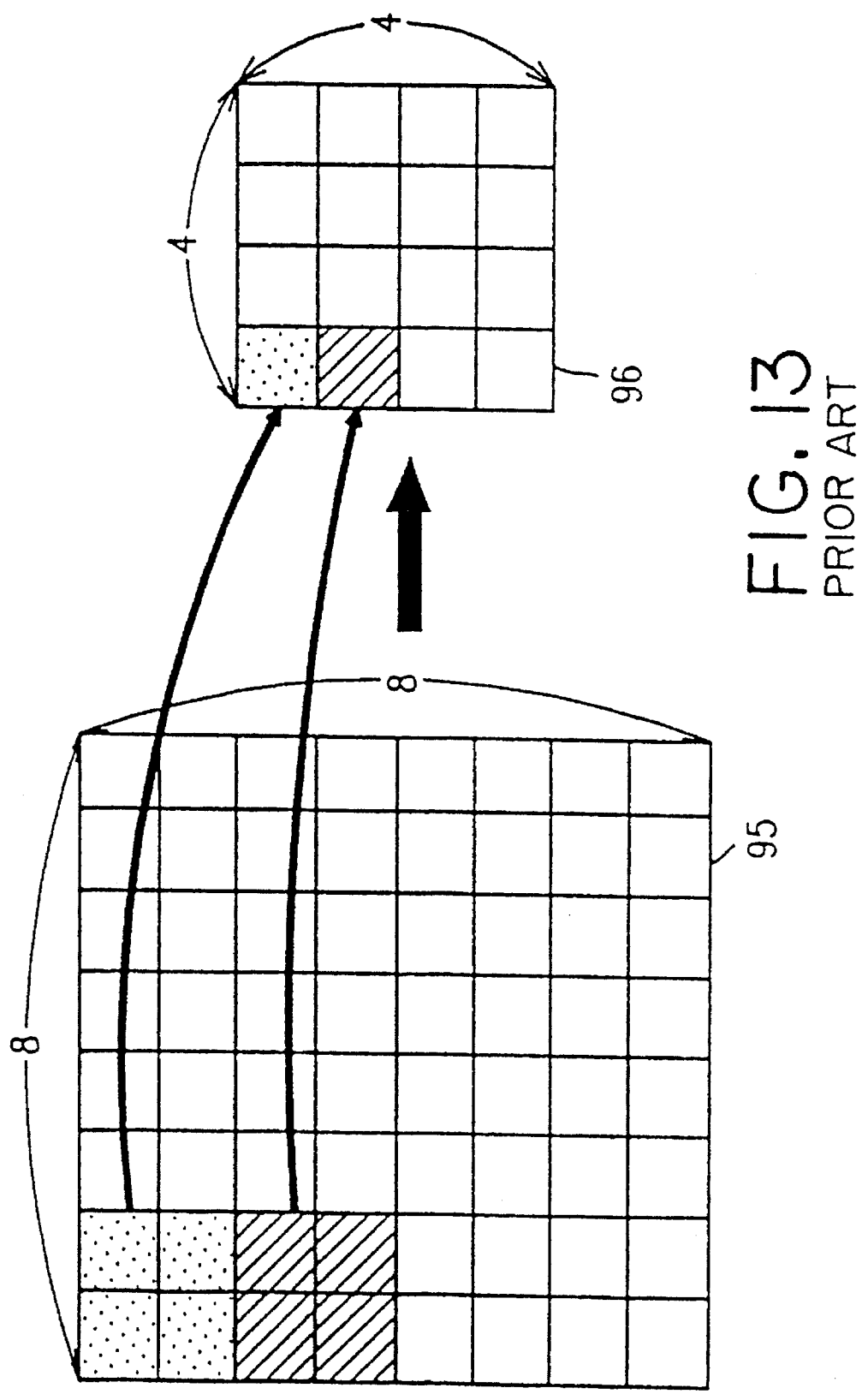
FIG. 13 is a diagram showing an original texture image and a MIP-map image.

Referring to FIGS. 1 and 5, the MIP-map image generating method according to the invention will be described.

In Step 11, the polygon calculating section 6 receives a command for rendering a specific polygon from the CPU 2.

In Step 12, the polygon calculating section 6 converts the coordinates of the polygon from the 3D world coordinates into the 2D display coordinates. This transformation is performed based on the coordinates of points which define the respective surfaces of the polygon in the world coordinate system, the coordinates of the view point in the world coordinate system, and the data such as a view angle.

In Step 13, "the size of polygon" is calculated by the shove-described method.

In Step 14, an original image of texture to be mapped to the polygon is read out from a recording medium storing the original texture image, and input into the DCT section 5. For example, when the original texture image is stored in the CD-ROM, data is read from the CD-ROM drive 4 shown in FIG. 1.

In Step 15, the DCT section 5 divides the input original texture image into image blocks. The original texture image is composed of M pixels in the vertical direction and N pixels in the horizontal direction. Typically, the original texture image is composed of 128×128 pixels, but the invention is not limited to this specific number of pixels. In order to generate a MIP-map with a color image, the original texture image preferably has R, G, and B (red, green, and blue) data for each pixel. If data of one pixel has 8 bits for each of the colors, i.e., R, G, and B, each color can be represented in 256 gray-scale levels. Accordingly, it is possible to represent gray-scale levels of approximately 16,770,000 colors.

In Step 15, the input original texture image is divided into a plurality of image blocks each including n pixels in the vertical direction and n pixels in the horizontal direction. In this example, the case where n=8 is described. The value of n can be selected to whatever is desired. For example, the value of n can be 16. The size of an image block is preferably selected from the range of 8 to 16 pixels in each of the horizontal and vertical directions, in view of the transform efficiency of the discrete cosine transformation and the inverse discrete cosine transformation. However, the size of image block is not limited to this specific range. If the scale of a DCT apparatus and an IDCT apparatus is large, it is possible to handle a large size of an image block. In other cases where the number of pixels in each of the horizontal and vertical directions is the power of 2, it is possible to generate a MIP-map image at a high speed by utilizing various fast transformation algorithms.

In Step 16, each image block is processed by discrete cosine transformation. As a result, each image block is transformed into a spatial frequency image data block in a spatial frequency domain. Herein, the term "image block" indicates a unit of data which is obtained by dividing the original texture image into units of 8×8 pixels in both directions, as shown in FIG. 6. In the image block 51 shown in FIG. 6, 8 bits are assigned to each bit, and for simplicity, a monochrome image block is exemplary shown. Therefore, the numeric value of each pixel represents the brightness of the pixel in 256 gray-scale levels. The horizontal direction and the vertical direction of the image block in FIG. 6 correspond to the x-axis direction and the y-axis direction of the display, respectively.

FIG. 7 shows an example of spatial frequency image data block 52 which is obtained by performing the discrete cosine transformation to the image block shown in FIG. 6. In the spatial frequency image data block 52, each pixel has the information amount of 10 bits including the sign thereof. In the same way as in representing elements of a matrix, the upper-left element is represented by (1, 1), the upper-right element is represented by (8, 1), the lower-left element is represented by (1, 8), and the lower-right element is represented by (8, 8). In FIG. 7, in the left-to-right direction, the spatial frequency in the x-axis direction fx is increased, and in the downward direction, the spatial frequency in the y-axis direction fy is increased. Herein, when a checkered pattern (a pattern like a chess board) is represented in an image block as shown in FIG. 6, the spatial frequencies in the x-axis and y-axis directions are maximum, and the spatial frequencies are represented by $f_s$. The (1, 1) element in FIG. 7 is a mean value of the elements having the spatial frequency in the x-axis direction in the range of 0 to $f_s/8$, and the spatial frequency in the y-axis direction in the range of 0 to $f_s/8$. The (2, 1) element is a mean value of the elements having the spatial frequency in the x-axis direction in the range of $f_s/8$ to $2f_s/8$, and the spatial frequency in the y-axis direction in the range of 0 to $f_s/8$. Similarly, the (8, 1) element is a mean value of the elements having the spatial frequency in the x-axis direction in the range of $7f_s/8$ to $f_s$, and the spatial frequency in the y-axis direction in the range of 0 to $f_s/8$. The (1, 8) element is a mean value of the elements having the spatial frequency in the x-axis direction in the range of 0 to $f_s/8$, and the spatial frequency in the y-axis direction in the range of $7f_s/8$ to $f_s$.

In general, the 2D discrete cosine transformation and the inverse discrete cosine transformation are calculated in accordance with Equations (1), (2), and (3) below:

$$F(u,v) = \frac{2}{N} C(u)C(v) \sum_{x=0}^{N-1} \sum_{y=0}^{N-1} f(x, y)\cos\left[\frac{\pi u(2x+1)}{2N}\right] \cos\left[\frac{\pi v(2y+1)}{2N}\right] \quad (1)$$

$$f(x,y) = \frac{2}{N} \sum_{u=0}^{N-1} \sum_{v=0}^{N-1} C(u)C(v)F(u,v)\cos\left[\frac{\pi u(2x+1)}{2N}\right] \cos\left[\frac{\pi v(2y+1)}{2N}\right] \quad (2)$$

$$C(w) = \begin{cases} 1/\sqrt{2} : & w = 0 \\ 1: & w = 1, 2, \ldots, N-1 \end{cases} \quad (3)$$

In Equations (1), (2), and (3), f(x, y) denotes the value of a 2D image signal in a spatial domain, u and v denote spatial frequencies in the x-axis and y-axis directions, respectively, N denotes the number of pixels, and F(u, v) denotes the intensity of frequency component in the spatial frequency domain. In this example, N=8. Various fast calculation methods have been proposed for the discrete cosine transformation and the inverse discrete cosine transformation.

In Step 17, reduction rates for reducing the size of the original texture to the size of the MIP-map image, i.e., the resolution ratios in the x-axis and y-axis directions which are described above are calculated, based on the size of the polygon on the display which has been obtained in Step 13.

In Step 18, high-frequency components which are not required are removed, so as to generate filtered spatial frequency image data. Specifically, in the spatial frequency image data block, elements of higher spatial frequency components are replaced with 0. FIG. 8 shows the filtered spatial frequency image data when the vertical resolution ratio is ½ and the horizontal resolution ratio is ⅜. Since the resolution ratio is ½ in the vertical direction, the texture size is reduced to be ½ in the vertical direction. Accordingly, the maximum value of the required spatial frequency is $f_s/2$. Similarly, the required spatial frequency in the horizontal direction is $3f_s/8$. If the elements in the higher-frequency region than the region enclosed by the ellipse which passes over the (3, 1) element and the (1, 4) element of a spatial frequency image data shown in FIG. 7 are replaced with "0", the higher-frequency components which are not required are removed as shown in FIG. 8. For example, the resolution ratios in the vertical and horizontal directions are both ½, the elements in the higher-frequency region than the region enclosed by a part of a circle which passes over the (4, 1) element and the (1, 4) element are replaced with "0". In this example, the region to be replaced with "0" is defined by a part of a circle or a part of an ellipse (FIGS. 9A and 9B, respectively), but the region may be defined by a straight line (FIG. 9C).

The method for replacing part of the spatial frequency image data block with "0" can be implemented by software. For example, a step function having a coefficient of 1 in the spatial frequencies equal to or lower than the cutoff frequency and a coefficient of 0 in the spatial frequencies higher than the cutoff frequency shown in FIG. 10A is defined. If a product of the filter function and each pixel data is obtained by the software, the same result as in the case where the data elements having spatial frequencies higher than the cutoff frequency are replaced with "0" can be obtained. As shown in FIG. 10B, another-type of filter function may be used, instead of the step function.

In Step 19, the filtered spatial frequency image data block which is obtained in Step 18 is processed by inverse discrete cosine transformation, so as to generate a filtered image block in the spatial domain. FIG. 11 shows a filtered image block 54.

In Step 20, the filtered image blocks obtained in Step 19 are merged, so as to generate a filtered image having the same size as that of the original texture image. Thereafter, the filtered image is reduced in size in accordance with the resolution ratios obtained in Step 17, so as to acquire a MIP-map image. In Step 20, the MIP-map image is mapped to the polygon.

In Step 21, the digitized image obtained in Step 20 is converted into an analog signal which can be displayed in a display apparatus.

A data compression step and a data expansion step may be included between Step 16 and Step 18. Specifically, the spatial frequency image data block obtained in Step 16 is compressed without loss of information, and the compressed data is expanded prior to the execution of Step 18, so as to reconstruct the spatial frequency image data block. In order to avoid deterioration of the image quality through data compression and expansion process, lossless compression is preferable.

In this example, the discrete cosine transformation and the inverse discrete cosine transformation are used as the spatial frequency transformation and the inverse spatial frequency transformation, respectively. However, other transformation methods can be used insofar as they are paired as the spatial frequency transformation and the inverse frequency transformation. For example, a pair of discrete Fourier transformation and inverse discrete Fourier transformation, or a pair of Wavelet transformation and inverse Wavelet transformation can be used.

According to the invention, the original texture image is processed by spatial transformation, so as to be spatial frequency image data. The spatial frequency image data is low-pass filtered in the spatial frequency domain. After the filtered spatial frequency image data is processed by inverse spatial transformation, it is reduced in size. Thus, a MIP-map image having a predetermined size can be obtained. Accordingly, it is sufficient to store only original images. Various MIP-map images transformed in various sizes are not required to be stored in a memory. Therefore, the present invention can attain at least the following effects:

(1) The memory capacity required for storing original texture images is small.
(2) It is possible to prevent the image quality being degraded because no aliasing noise is caused in the generated MIP-map image.
(3) No aliasing noise is caused in a MIP-map image with different resolution ratios in the horizontal and vertical directions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for MIP-map image generation, which receives an original image of texture and reduces the original image in size in accordance with a size of a polygon to which the texture is mapped, the apparatus comprising:

image dividing means for receiving the original image and for dividing the original image, to generate image blocks;

a spatial transformation means for transforming each of the image blocks in a spatial domain into spatial frequency image block in a spatial frequency domain;

image storing means for storing the spatial frequency image data block;

MIP-map resolution calculating means for calculating a size of a polygon to be displayed on a display, and for calculating a resolution corresponding to the size of the polygon;

low-pass filter means for removing, from the spatial frequency image data block, components having higher frequencies which are higher than a predetermined frequency corresponding to the resolution obtained by the MIP-map resolution calculating means, to generate a filtered spatial frequency image data block; and inverse spatial transformation means for receiving the filtered spatial frequency image data block, and for transforming the filtered spatial frequency image data block into a filtered image block in the spatial domain.

2. An apparatus for MIP-map image generation according to claim 1, wherein the spatial transformation means transforms each of the image blocks into the spatial frequency image data block by discrete cosine transform, and wherein the inverse spatial transformation means transforms the filtered spatial frequency image data block into the filtered image block by inverse discrete cosine transform.

3. An apparatus for MIP-map image generation according to claim 1, wherein the image dividing means divides the original image of texture into image blocks, the numbers of the image blocks in a horizontal direction and in a vertical direction being the power of 2.

4. An apparatus for MIP-map image generation, comprising:

image dividing means for receiving an image of texture to be mapped onto a polygon and for dividing the image, to generate image blocks;

spatial transformation means for transforming each of the image blocks in a spatial domain into spatial frequency image block in a spatial frequency domain;

data compression means for compressing the spatial frequency image data block without loss of information, to generate a compressed spatial frequency image data block;

texture image storing means for storing the compressed spatial frequency image data block;

data expansion means for expanding the compressed spatial frequency image data block which is stored in the texture image storing means, to generate a spatial frequency image data block;

MIP-map resolution calculating means for calculating a size of the polygon to be displayed on a display, and for calculating a texture resolution corresponding to the size of the polygon;

low-pass filter means for removing, from the spatial frequency image data block, components having higher frequencies which are higher than a predetermined frequency corresponding to the texture resolution obtained by the MIP-map resolution calculating means, to generate a filtered spatial frequency image data block; and inverse spatial transformation means for receiving the filtered spatial frequency image data block, and for transforming the filtered spatial frequency image data block into a filtered image block in the spatial domain.

5. An apparatus for MIP-map image generation, which receives original image data representing a 2-dimensional image, and outputs transformed image data representing an image with a size different from that of the 2-dimensional image, the apparatus comprising:

Mip-map resolution calculating means for calculating a resolution ratio of the transformed image data to the original image data:

spatial transformation means for receiving the original image data in a spatial domain, and for transforming the original image data into a spatial frequency image data in a spatial frequency domain, to output the spatial frequency image data;

low-pass filter means for receiving the spatial frequency image data in the spatial frequency domain, and for removing components having frequencies higher than a predetermined frequency corresponding to the resolution ratio obtained by the MIP-map resolution calculating means, to output filtered spatial frequency image data; and inverse spatial transformation means for receiving and transforming the filtered spatial frequency image data in the spatial frequency domain, and for outputting transformed image data in the spatial domain.

6. A method for MIP-map image generation, for receiving original image data representing a 2-dimensional image, and for outputting transformed image data representing an image with a size different from that of the 2-dimensional image, the method comprising:

a MIP-map resolution calculating step of calculating a resolution ratio of the transformed image data to the original image data;

a spatial transformation step of receiving the original image data in a spatial domain, and of transforming the original image data into a spatial frequency image data in a spatial frequency domain;

a low-pass filtering step of receiving the spatial frequency image data in the spatial frequency domain, and of removing components having frequencies higher than a predetermined frequency corresponding to the resolution ration obtained by the MIP-map resolution calculating step, to output filtered spatial frequency image data; and an inverse spatial transformation step of receiving the filtered spatial frequency image data in the spatial frequency domain, and of transforming the filtered spatial frequency image data into transformed image data in the spatial domain.

7. A method for MIP-map image generation according to claim 6, further comprising, between the spatial transformation step and the inverse spatial transformation step:

data compressing step of compressing the spatial frequency image data;

data storing step of storing the compressed spatial frequency image data; and data expanding step of expanding the stored and compressed spatial frequency image data, to obtain spatial frequency image data.

* * * * *